United States Patent
Lawrence

(10) Patent No.: US 7,097,026 B2
(45) Date of Patent: Aug. 29, 2006

(54) MAGNETIC TURNAROUND

(75) Inventor: Eric C. Lawrence, South El Monte, CA (US)

(73) Assignee: Lawrence Equipment, Inc., South El Monte, CA (US)

( * ) Notice: Subject to any disclaimer, the term of this patent is extended or adjusted under 35 U.S.C. 154(b) by 64 days.

(21) Appl. No.: 10/957,303

(22) Filed: Sep. 30, 2004

(65) Prior Publication Data

US 2005/0067260 A1 Mar. 31, 2005

Related U.S. Application Data

(60) Provisional application No. 60/481,452, filed on Sep. 30, 2003.

(51) Int. Cl.
 *B65G 13/02* (2006.01)
(52) U.S. Cl. .................................. 198/690.1
(58) Field of Classification Search ................ 198/805, 198/603, 606, 688.1, 690.1
 See application file for complete search history.

(56) References Cited

U.S. PATENT DOCUMENTS

| | | | |
|---|---|---|---|
| 2,709,412 A | 5/1955 | Eagerman | 107/57 |
| 3,447,663 A | 6/1969 | Sarovich | 198/30 |
| 3,590,974 A | 7/1971 | Loveless | 198/30 |
| 3,642,118 A * | 2/1972 | Kornylak | 198/690.1 |
| 3,754,635 A | 8/1973 | Mojden | 198/41 |
| 3,858,710 A | 1/1975 | Spodig | 198/41 |
| 4,337,856 A | 7/1982 | Dorner | 198/599 |
| 4,715,272 A | 12/1987 | Mendoza | 99/339 |
| 4,934,513 A | 6/1990 | Kirkpatrick et al. | 198/612 |
| 5,392,696 A | 2/1995 | Navarro et al. | 99/339 |
| 5,680,922 A * | 10/1997 | Bessels | 198/398 |
| 5,896,873 A * | 4/1999 | Furlani et al. | 134/32 |

* cited by examiner

*Primary Examiner*—James R. Bidwell
(74) *Attorney, Agent, or Firm*—Robert J. Rose; Sheldon & Mak

(57) ABSTRACT

An apparatus for transferring an object from a first conveyor to a second conveyor, the apparatus having a drive roller; a guide having a first end and a length, the first end being positioned adjacent the drive roller; a guide roller, the guide roller being magnetic and positioned adjacent to the guide along the length of the guide; and a conveyor positioned around the drive roller, the guide, and the guide roller; wherein the conveyor has a ferrous component causing the conveyor to be moveably coupled to the guide roller.

22 Claims, 5 Drawing Sheets

MAGNETIC TURNAROUND

CROSS-REFERENCE TO RELATED APPLICATION

The present application claims the benefit of U.S. Provisional Patent Application No. 60/481,452, filed on Sep. 30, 2003, entitled MAGNETIC TURNAROUND, the entire contents of which are hereby incorporated herein by reference.

BACKGROUND

The present invention is directed to a conveyor system and more specifically, to a conveyor system employing a turnaround between conveyors.

Ovens for preparing food often employ conveyor belts moving cooking food items. Often the belts themselves are heated. Some food items need to be cooked on each side, one side at a time. For those types of items, the oven typically contains stacked conveyors running in opposite directions across the oven. The food item reaches the end of one conveyor and then flips down a turnaround to land on the next lower conveyor on an opposite side.

Static turnarounds, such as curved sheets of metal, have been used guide the item from an upper conveyor to a lower conveyor. Unfortunately, food items often stick to the static turnaround, causing a jam when subsequent food items were forwarded into the stuck item by the conveyor. In order to remedy this situation moving turnarounds were developed.

A prior art moving turnaround is shown in FIG. 1. Moving turnarounds typically have a powered roller 2 coupled to a drive mechanism for one of the conveyors so that the roller turns at the same speed as the conveyor. The powered roller is placed proximately to a guide 4 having a shape conducive to flipping objects. A belt 6 is positioned around the turnaround guide and coupled to the powered roller. To keep the shape of the moving belt conforming somewhat to the shape of the guide, the guide edges are fitted with brackets 8 that belt edges pass through.

Moving turnarounds constructed with brackets are problematic because the brackets are an ineffective means of causing the middle of the belt to conform to the shape of the guide. This is especially true where the belt is very wide and the distance between the brackets is large. Because the middle of the belt is not held down consistently with the edges, the product contacting the middle area reacts differently during the turning process. Additionally, the brackets cause the belt to prematurely wear out in the areas where the brackets contact the belt. Additionally, the brackets pick up dirt coming off the belt and must be frequently cleaned.

Thus, there is a need for an improved moving turnaround. Moreover, the need extends beyond cooking systems to other types of processes where conveyors are used, such as with cooling systems and assembly systems.

SUMMARY

Accordingly, the present invention, in an embodiment, is directed to an apparatus for transferring an object from a first conveyor to a second conveyor. The apparatus has a drive roller; and a guide having a first end and a length, the first end being positioned adjacent the drive roller. A magnetic guide roller is positioned adjacent to the guide along the length of the guide. A conveyor is positioned around the drive roller, the guide, and the guide roller. The conveyor has a ferrous component causing the conveyor to be moveably coupled to the guide roller.

Optionally, the guide comprises a plurality of openings; the guide roller comprises a plurality of magnetized portions; and the magnetized portions protrude through the plurality of openings. The plurality of magnetized portions can comprise permanent magnets. The plurality of magnetized portions can comprise adjustable electromagnets.

Optionally, the drive roller, guide, and guide roller are coupled to a frame. The guide and guide roller may be coupled to the frame by an adjustable bracket. The guide roller may be coupled to the drive roller. The conveyor may be a ferrous metal alloy mesh belt. Optionally, the guide is magnetic; and a side of the conveyor in contact with the guide is coated with a friction reducing coating.

The present invention is also directed to a system for transferring an object between driven conveyors comprising: a first conveyor having a discharge end; a second conveyor parallel to the first conveyor, the second conveyor having an uptake end. A turnaround is positioned between the discharge end and the uptake end; the turnaround comprising: a drive roller; a guide having a first end and a length, the first end being positioned adjacent the drive roller; a guide roller, the guide roller being magnetic and positioned adjacent to the guide along the length; and a turnaround conveyor positioned around the drive roller, the guide, and the guide roller. The turnaround conveyor has a ferrous component causing the turnaround conveyor to be moveably coupled to the guide roller.

The present invention is also directed to a system for transferring an object from a first conveyor to a second conveyor, the apparatus having a drive means; and a guide having a first end and a length, the first end being positioned adjacent the drive means. A belt is positioned around the drive means and the guide. The system also has a means for movably coupling the belt to the guide using magnetism.

BRIEF DESCRIPTION OF THE DRAWINGS

A better understanding of the present invention will be had with reference to the accompanying drawings in which.

DETAILED DESCRIPTION

Figure 1:
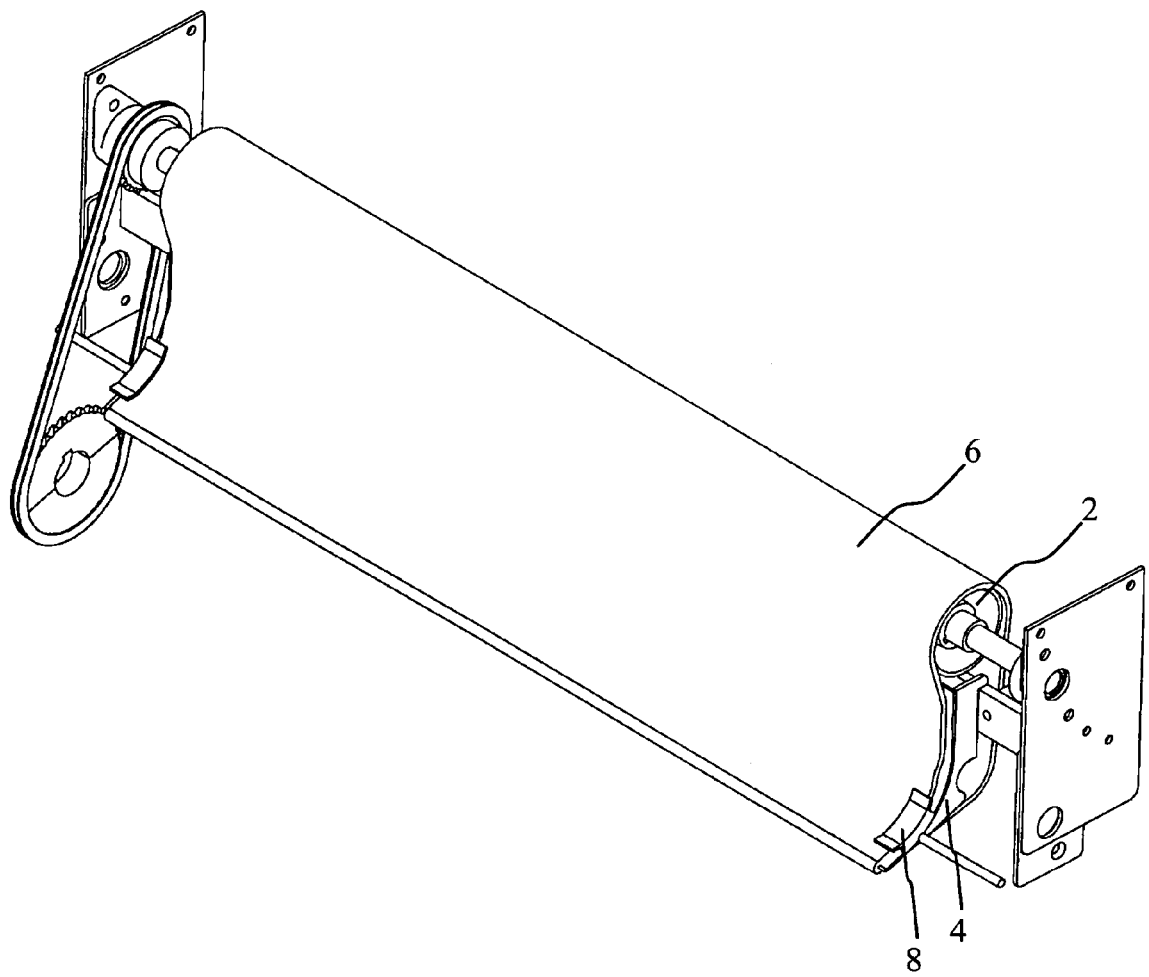
FIG. 1 is a front perspective view of a moveable turnaround according to the prior art.
Figure 2:
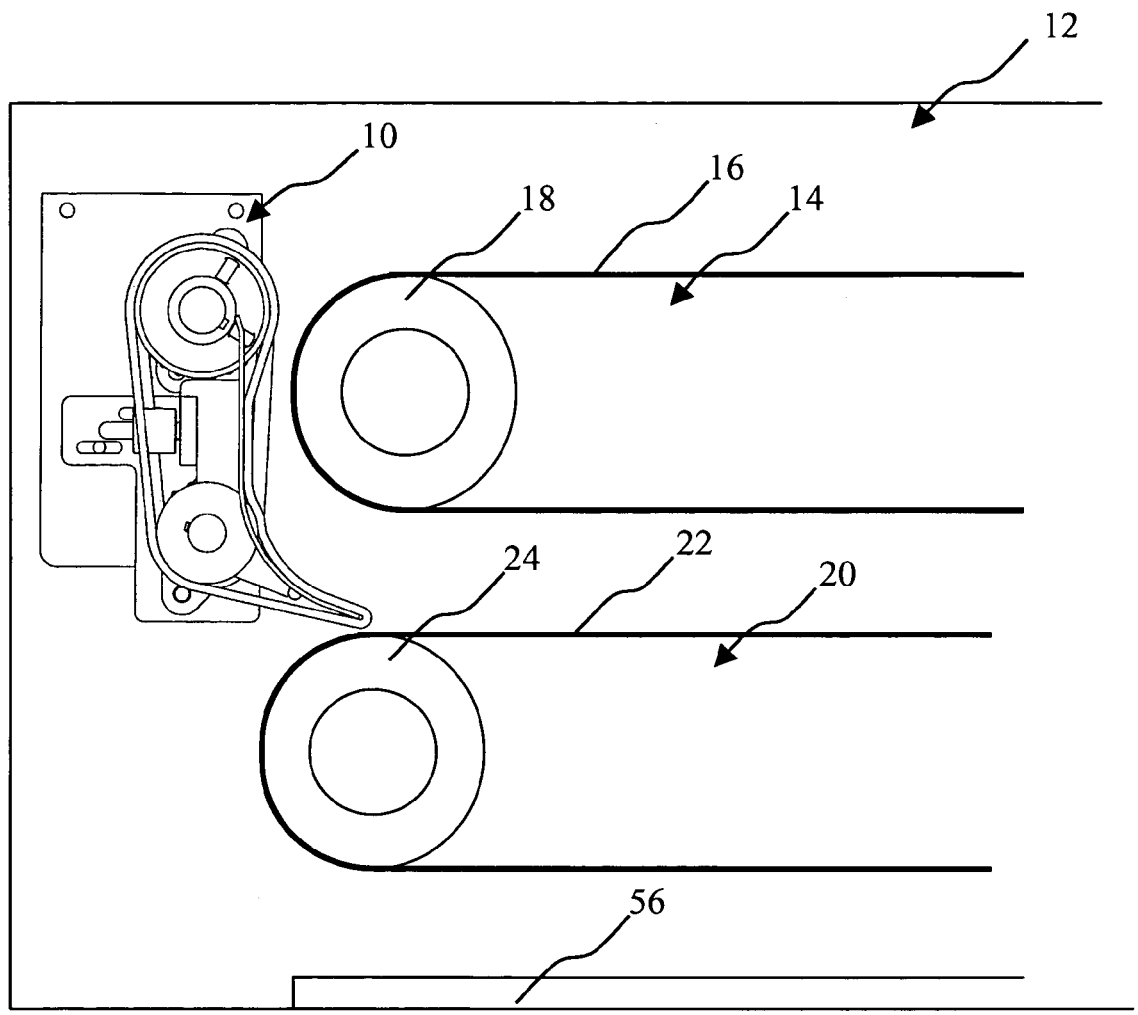
FIG. 2 is a side elevation view of a heating system employing a magnetic turnaround according to an embodiment of the present invention.

As shown in FIG. 2, the present invention is directed to a turnaround 10 for use in a conveyor system 12. According to an embodiment of the present invention, the conveyor system 12 has an upper conveyor 14. The upper conveyor has a belt 16 positioned around a first conveyor roller 18. The conveyor system 12 also has a lower conveyor 20. The lower conveyor 20 has a belt 22 positioned around a second conveyor roller 24. The turnaround 10 is positioned proximal to a discharge end of the upper conveyor and an uptake end of the lower conveyor.

Typically, the upper and lower conveyor belts 16, 22 are endless belts supported between multiple rollers (only end rollers 18, 24 being shown in FIG. 2). Means for driving the upper and lower conveyor belts will be known to those of ordinary skill in the art with reference to this disclosure. The upper and lower conveyors 14, 20 are wide enough to accommodate the objects moved thereon. Optionally, for example, the first and second conveyors are wide enough to accommodate multiple objects side by side.

Figure 3:
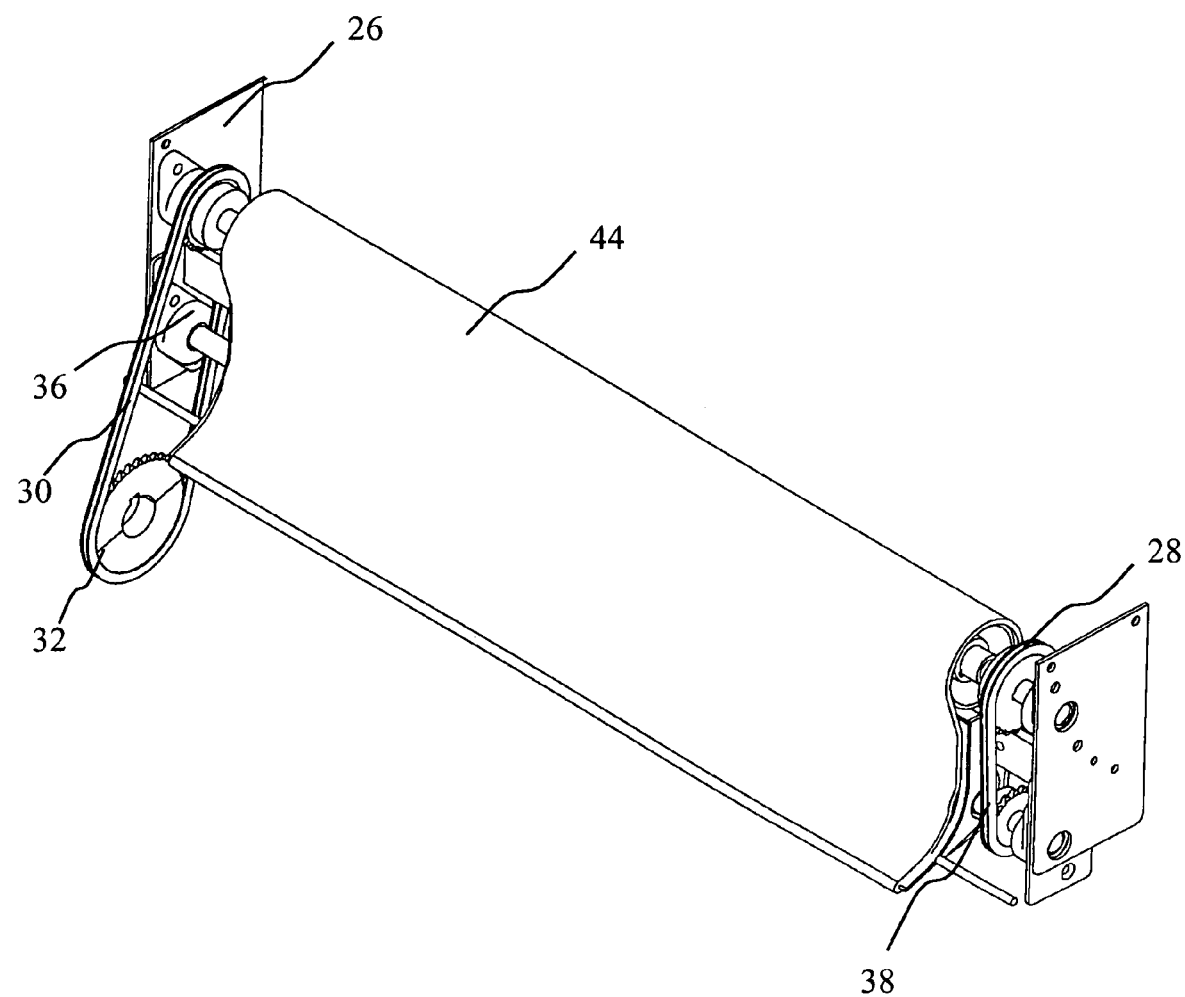
FIG. 3 is a front perspective view of the magnetic turnaround of FIG. 2.
Figure 4:
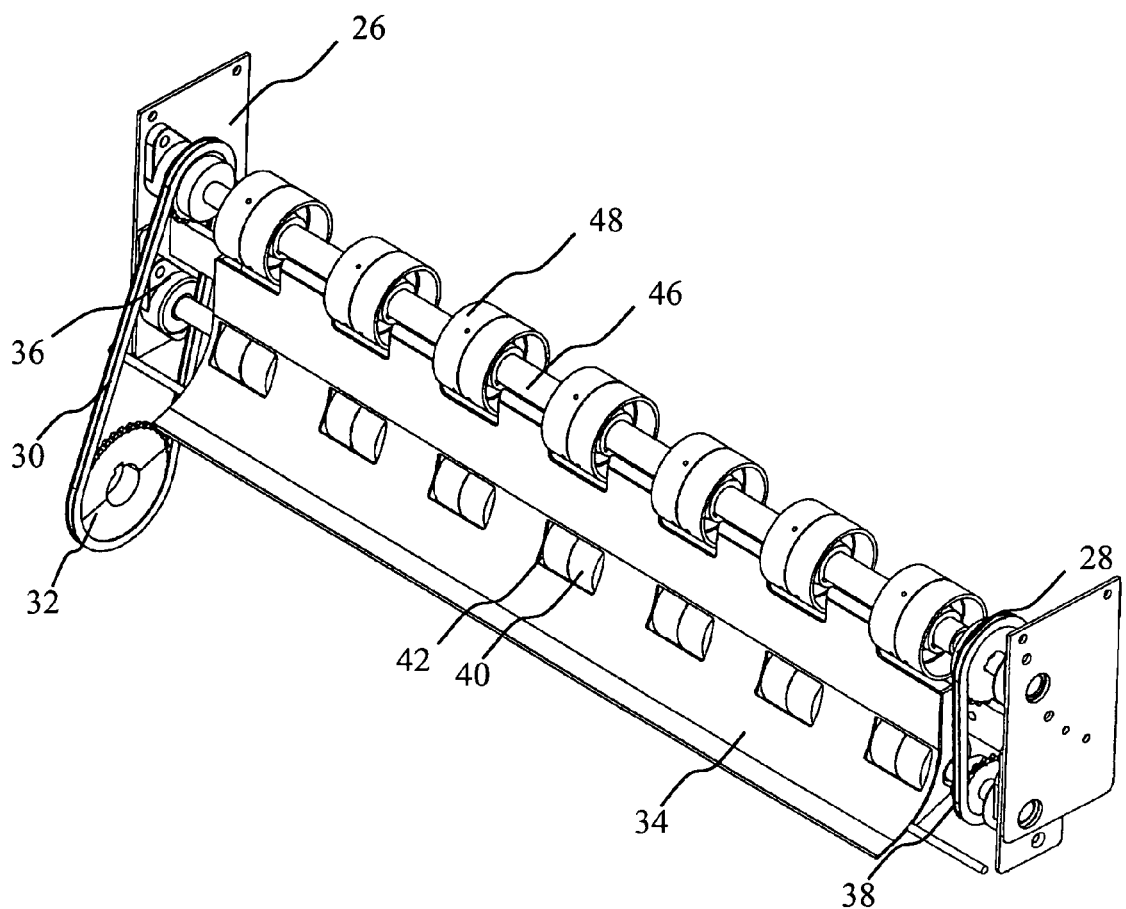
FIG. 4 is a front perspective view of the magnetic turnaround of FIG. 3 with the belt removed.
Figure 5:
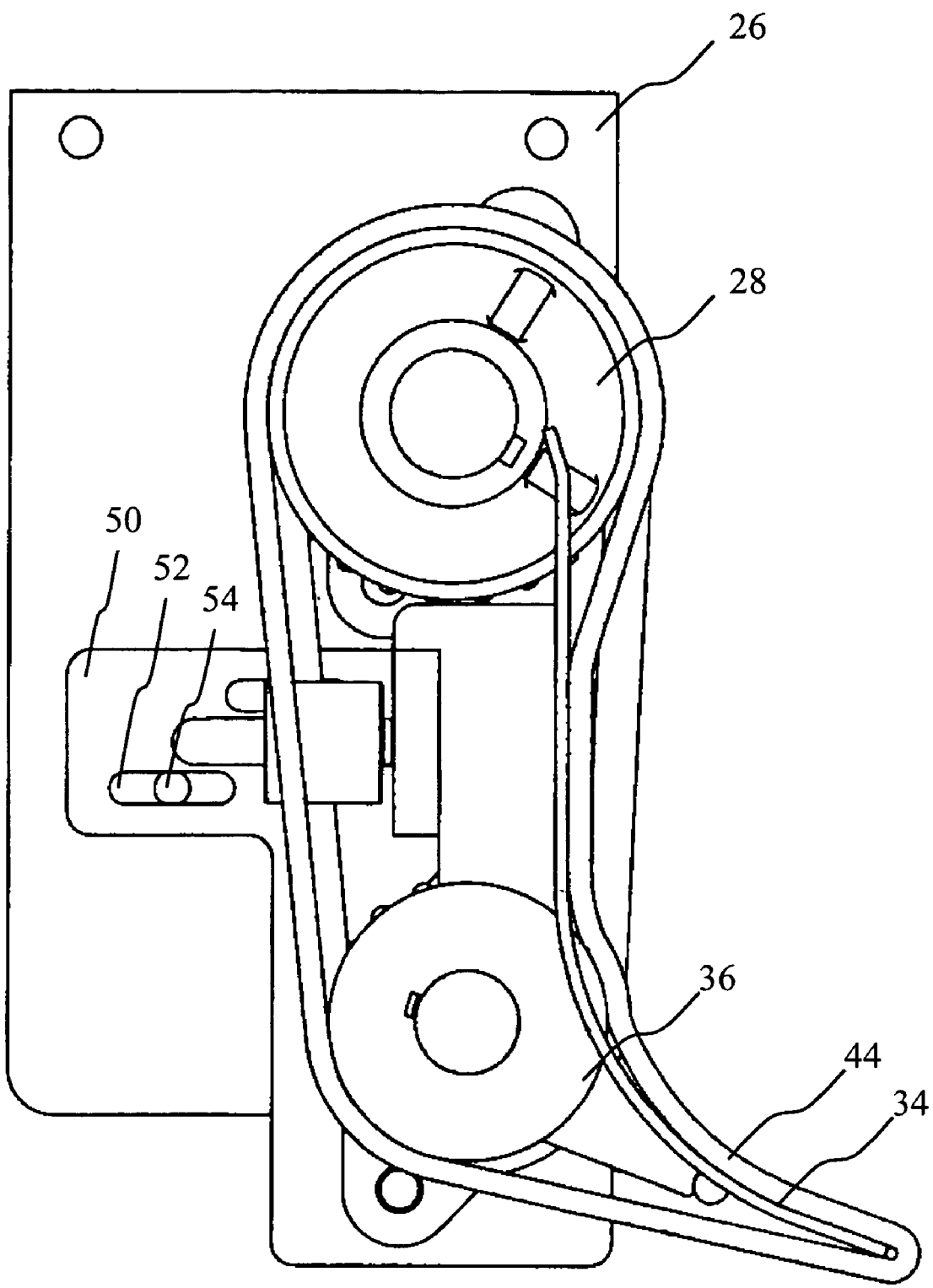
FIG. 5 is an enlarged side elevation view of the magnetic turnaround of FIG. 2.

The turnaround 10 will now be considered in more detail with reference to FIGS. 3 to 5. The turnaround 10 has a frame 26. A powered roller 28 is mounted to the frame 26. The powered roller 28 is either directly coupled to a drive means (not shown) or coupled via a belt chain 30 to a drive sprocket 32. A guide 34 is coupled to the frame 26 in close proximity to the powered roller 28.

A guide roller 36 is also attached to the frame. The guide roller may be coupled to the powered roller 28 through a coupling means, such as a chain 38. The guide roller 36 has a plurality of magnetized portions 40. In an embodiment of the present invention, the guide 34 has a plurality of openings 42, and the magnetized portions 40 of the guide roller 36 are inserted through the openings 42.

A turnaround belt 44, having a ferrous component, is mounted around the powered roller 28, along the guide 34 and around the guide roller 36. As used herein the term "ferrous" refers to a material capable of being attracted by a magnet. The turnaround belt 44 can be, for example, a ferrous metal alloy mesh belt. Alternatively, the turnaround belt 44 can be a fabric belt with ferrous material coupled thereto.

In an embodiment of the present invention, the powered roller has a central shaft 46 and a plurality of raised contact portions 48. The contact portions 48 have a magnetic coefficient and grip the turnaround belt 44 via magnetism. Optionally, the turnaround belt 44 has staggered openings corresponding to teeth on one or more of the powered roller 28 and the guide roller 36 to allow the belt to be efficiently driven. The use of a magnetic guide roller coupled with the ferrous material in the turnaround belt eliminates the need for brackets on the edges of the guide.

In an embodiment of the present invention, the magnetized portions 40 of the guide roller 36 are permanent magnets mounted to the guide roller 36. Alternatively, the magnetized portions 40 are electromagnets coupled to a controller (not shown) that can alter the strength of the magnetized portions depending on the materials used in the turnaround belt and the weight of the turnaround belt. One skilled in the art will recognize that the magnets may be located on the turnaround belt 44 and the guide roller may have a ferrous materials. This arrangement may be undesirable for some systems though, such as where the objects to be processed contain ferrous materials.

In an additional embodiment of the present invention, the guide 34 is magnetized either using permanent magnets or electromagnets. Optionally, with a magnetized guide, no guide roller is used. Preferably, the side of the belt 44 in contact with the guide 34 is coated with a friction reducing coating to allow the belt to remain in contact with the guide, while preventing undue wear on the belt or inefficiency in the system.

Preferably, the frame 26 is removeably attachable to the remainder of the conveyor system components using a few fasteners. The frame 26 allows the turnaround to be accessed and replaced as a module. Routine maintenance may be performed either in place or by removing the turnaround unit with few fasteners needing to be removed.

Optionally, as shown in FIG. 5, the guide 34 and guide roller 36 are coupled to the frame 26 by an adjustable bracket 50. The adjustable bracket contains a plurality of slots 52. A fastener 54, such as a screw is inserted through each slot into a corresponding opening (not shown) in the frame 26. The adjustable bracket 50 allows the angle of the turnaround to be adjusted. Additionally, the adjustable bracket 50 allows the position of the turnaround to be altered based on the height of the objects to be conveyed.

As shown in FIG. 2, the magnetic turnaround of the present invention may be employed in an oven having a heat source 56. Those skilled in the art will recognize that the magnetic turnaround described herein may be used in other conveyor systems, besides those found in ovens. For example, the magnetic turnaround may be used in cooling systems, where objects are flipped to enhance cooling. Additionally, for example, the magnetic turnaround of the present invention may be used in assembly systems where objects are flipped to allow access to different sides of an object at different points in the assembly process.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except a combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. §112.

What is claimed is:

1. An apparatus for transferring an object from a first conveyor to a second conveyor, the apparatus comprising:
    (a) a drive roller;
    (b) a guide having a first end and a length, the first end being positioned adjacent the drive roller;
    (c) a guide roller, the guide roller being magnetic and positioned adjacent to the guide along the length of the guide; and
    (d) a conveyor positioned around the drive roller, the guide, and the guide roller, the conveyor consisting essentially of a ferrous material for coupling the conveyor to the guide roller.

2. An apparatus for transferring an object from a first conveyor to a second conveyor, the apparatus comprising:
    (a) a drive roller;
    (b) a guide having a first end and a length, the first end being positioned adjacent the drive roller;
    (c) a guide roller, the guide roller being magnetic and positioned adjacent to the guide along the length of the guide; and
    (d) a third conveyor positioned around the drive roller, the guide, and the guide roller;
wherein:
    the third conveyor has a ferrous component causing the conveyor to be movably coupled to the guide roller;
    the guide comprises a plurality of openings;
    the guide roller comprises a plurality of magnetized portions; and
    the magnetized portions protrude through the plurality of openings.

3. The apparatus of claim 2 wherein the plurality of magnetized portions comprise permanent magnets.

4. The apparatus of claim 2 wherein the plurality of magnetized portions comprise adjustable electromagnets.

5. The apparatus of claim 1 wherein the drive roller, guide, and guide roller are coupled to a frame.

6. The apparatus of claim 5 wherein the guide and guide roller are coupled to the frame by an adjustable bracket.

7. The apparatus of claim 1 wherein the guide roller is coupled to the drive roller.

8. An apparatus for transferring an object from a first conveyor to a second conveyor, the apparatus comprising:
 (a) a drive roller;
 (b) a guide having a first end and a length, the first end being positioned adjacent the drive roller;
 (c) a guide roller, the guide roller being magnetic and positioned adjacent to the guide along the length of the guide; and
 (d) a third conveyor positioned around the drive roller, the guide, and the guide roller;
wherein the third conveyor is a ferrous metal alloy mesh belt movably coupled to the guide roller.

9. An apparatus for transferring an object from a first conveyor to a second conveyor, the apparatus comprising:
 (a) a drive roller;
 (b) a guide having a first end and a length, the first end being positioned adjacent the drive roller;
 (c) a guide roller, the guide roller being magnetic and positioned adjacent to the guide along the length of the guide; and
 (d) a third conveyor positioned around the drive roller, the guide, and the guide roller;
wherein:
 the guide is magnetic;
 the third conveyor has a ferrous component causing the third conveyor to be movably coupled to the guide roller; and
 a side of the third conveyor in contact with the guide is coated with a friction reducing coating.

10. A system for transferring an object between driven conveyors comprising:
 a first conveyor having a discharge end;
 a second conveyor parallel to the first conveyor, the second conveyor having an uptake end; and
 a turnaround positioned between the discharge end and the uptake end; the turnaround comprising:
 a drive roller;
 a guide having a first end and a length, the first end being positioned adjacent the drive roller;
 a guide roller, the guide roller being magnetic and positioned adjacent to the guide along the length; and
 a turnaround conveyor positioned around the drive roller, the guide, and the guide roller;
 wherein the turnaround conveyor consists essentially of a ferrous material for movably coupling the turnaround conveyor to the guide roller.

11. A system for transferring an object between driven conveyors comprising:
 a first conveyor having a discharge end;
 a second conveyor parallel to the first conveyor, the second conveyor having an uptake end; and
 a turnaround positioned between the discharge end and the uptake end; the turnaround comprising:
 a drive roller;
 a guide having a first end and a length, the first end being positioned adjacent the drive roller;
 a guide roller, the guide roller being magnetic and positioned adjacent to the guide along the length; and
 a turnaround conveyor positioned around the drive roller, the guide, and the guide roller;
wherein:
 the turnaround conveyor has a ferrous component causing the turnaround conveyor to be movably coupled to the guide roller;
 the guide comprises a plurality of openings;
 the guide roller comprises a plurality of magnetized portions; and
 the magnetized portions protrude through the plurality of openings.

12. The system of claim 11, wherein the plurality of magnetized portions comprise permanent magnets.

13. The system of claim 11, wherein the plurality of magnetized portions comprise adjustable electromagnets.

14. The system of claim 10 further comprising a heat source.

15. The system of claim 10 wherein the drive roller, guide, and guide roller are coupled to a frame.

16. The system of claim 15 wherein the guide and guide roller are coupled to the frame by an adjustable bracket.

17. The system of claim 10 wherein the guide roller is coupled to the drive roller.

18. A system for transferring an object between driven conveyors comprising:
 a first conveyor having a discharge end;
 a second conveyor parallel to the first conveyor, the second conveyor having an uptake end; and
 a turnaround positioned between the discharge end and the uptake end; the turnaround comprising:
 a drive roller;
 a guide having a first end and a length, the first end being positioned adjacent the drive roller;
 a guide roller, the guide roller being magnetic and positioned adjacent to the guide along the length; and
 a turnaround conveyor positioned around the drive roller, the guide, and the guide roller;
wherein the turnaround conveyor is a ferrous metal alloy mesh belt movably coupled to the guide roller.

19. A system for transferring an object between driven conveyors comprising:
 a first conveyor having a discharge end;
 a second conveyor parallel to the first conveyor, the second conveyor having an uptake end; and
 a turnaround positioned between the discharge end and the uptake end; the turnaround comprising:
 a drive roller;
 a guide having a first end and a length, the first end being positioned adjacent the drive roller;
 a guide roller, the guide roller being magnetic and positioned adjacent to the guide along the length; and
 a turnaround conveyor positioned around the drive roller, the guide, and the guide roller;
wherein:
 the guide is magnetic;
 the turnaround conveyor has a ferrous component causing the turnaround conveyor to be movably coupled to the guide roller; and
 a side of the turnaround conveyor in contact with the guide is coated with a friction reducing coating.

20. An apparatus for transferring an object from a first conveyor to a second conveyor, the apparatus comprising:
(a) a drive means;
(b) a guide having a first end and a length, the first end being positioned adjacent the drive means;
(c) a belt positioned around the drive means and the guide; and (d) means for movably coupling the conveyor to the guide using magnetism.

21. An oven for cooking a food item, comprising: (a) a heat source for cooking the food item;
(b) a plurality of conveyors for moving the food item in proximity to the heat source; and
(c) at least one apparatus according to claim 20 for transferring the food item between two or more of the plurality of conveyors.

22. A method for processing an object, comprising:
(a) placing the object onto a first conveyor;
(b) transferring the object from the first conveyor to a second conveyor using the apparatus of claim 20; and
(c) removing the object from the second conveyor.

* * * * *